United States Patent
Kondo et al.

(10) Patent No.: US 6,757,443 B1
(45) Date of Patent: Jun. 29, 2004

(54) PICTURE PROCESSING APPARATUS, PICTURE PROCESSING METHOD, LEARNING APPARATUS, AND LEARNING METHOD

(75) Inventors: Tetsujiro Kondo, Tokyo (JP); Hisakazu Shiraki, Tokyo (JP); Hideo Nakaya, Kanagawa (JP); Toshihiko Hamamatsu, Saitama (JP); Yuji Okumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 09/602,934

(22) Filed: Jun. 23, 2000

Related U.S. Application Data (63) Continuation of application No. PCT/JP99/05876, filed on Oct. 25, 1999.

(30) Foreign Application Priority Data

| Oct. 26, 1998 | (JP) | ............................................. 10-304058 |
| Nov. 4, 1998 | (JP) | ............................................. 10-313057 |

(51) Int. Cl.[7] ................................................. G06K 9/40
(52) U.S. Cl. ........................ 382/275; 382/274; 382/282; 382/156; 382/159; 358/3.26; 358/453; 358/463
(58) Field of Search ................................. 382/295, 293, 382/291, 282, 278, 107, 190, 195, 252, 149, 209, 215, 216, 217, 218, 219, 274, 275, 284, 294, 299, 305, 309, 156–160; 348/417.1, 415.1, 412.1; 358/3.26, 3.27, 501, 537, 538, 452, 453, 463

(56) References Cited

U.S. PATENT DOCUMENTS 4,837,618 A * 6/1989 Hatori et al. ................ 358/135
4,926,361 A * 5/1990 Ohtsubo et al. ............. 348/607
4,999,704 A * 3/1991 Ando ........................... 358/133
5,289,274 A * 2/1994 Kondo ...................... 348/208.6
5,355,421 A * 10/1994 Koyama ..................... 382/266
5,565,921 A * 10/1996 Sasaki et al. ............. 348/409.1
5,719,793 A * 2/1998 Nitta et al. .................. 382/275
5,732,146 A * 3/1998 Yamada et al. ............. 382/107
5,892,518 A * 4/1999 Mizobata et al. ........... 345/474
6,043,823 A * 3/2000 Kodaira et al. ............. 345/433
6,104,439 A * 8/2000 Jeong et al. ................. 348/699
6,144,800 A * 11/2000 Kobayashi ................... 386/114
6,229,578 B1 * 5/2001 Acharya et al. ............. 348/607
6,400,890 B1 * 6/2002 Nagasaka et al. ............. 386/69

FOREIGN PATENT DOCUMENTS

| EP | 0 640 908 A1 | 3/1995 |
| JP | 10-11583 | 1/1998 |
| JP | 10-75386 | 3/1998 |
| JP | 10075386 | 3/1998 |

* cited by examiner

Primary Examiner—Bhavesh M. Mehta
Assistant Examiner—Yosef Kassa
(74) Attorney, Agent, or Firm—Frommer Lawrence & Haug LLP; William S. Frommer; Bruno Polito (57) ABSTRACT

An input picture signal having noise added through a transmission path or the like is supplied. Noise is removed from the input picture by a class categorizing adaptive process in which predictive coefficients are pre-learnt and decided for each class. A class corresponding to a noise component contained in the input picture is decided. Predictive coefficients of the class and the values of pixels of frames containing a considered pixel of the input picture signal are linearly combined. Thus, predictive pixel values are generated, which are free of noise. When motion of a considered pixel is detected and pixels that are used to decide a class and pixels that are used for a predictive calculation are compensated corresponding to the motion, noise accurately corresponding to a noise component can be removed from the input picture signal.

34 Claims, 10 Drawing Sheets

PICTURE PROCESSING APPARATUS, PICTURE PROCESSING METHOD, LEARNING APPARATUS, AND LEARNING METHOD

This is a continuation of copending International Application PCT/JP99/05876 having an international filing date of Oct. 25, 1999.

TECHNICAL FIELD

The present invention relates to a picture processing apparatus, a picture processing method, a learning apparatus, and a learning method that have a function for removing noise from an input picture signal.

RELATED ART

Figure 12:
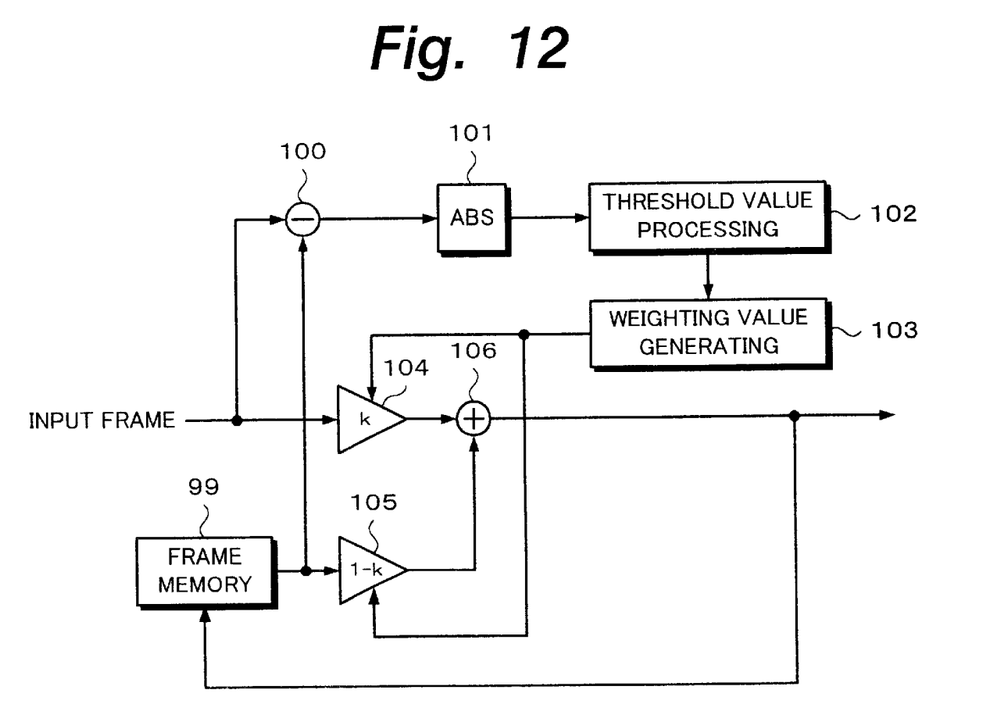
FIG. 12 is a block diagram showing an example of the structure for removing noise according to a related art reference.

In a picture signal processing system or the like used in for example a television receiver, to remove noise from a picture signal, a motion adaptive recursive filter has been used. FIG. 12 shows an example of the structure of the motion adaptive recursive filter. Referring to FIG. 12, an input picture signal of the current frame is supplied to a subtracting circuit 100. In addition, a picture signal of the chronologically earlier frame stored in a frame memory 99 is supplied to the subtracting circuit 100. The subtracting circuit 100 generates the difference between the picture signal of the current frame and the picture signal of the chronologically earlier frame and supplies the generated difference to an absolute value calculating circuit 101. The absolute value calculating circuit 101 converts the supplied difference into an absolute value. Output data of the absolute value calculating circuit 101 is supplied to a threshold value processing circuit 102. The threshold value processing circuit 102 performs a threshold value process for the supplied absolute value with a predetermined threshold value and determines whether or not each picture has a motion.

The determined result of the threshold value processing circuit 102 is supplied to a weighting value generating circuit 103. The weighting value generating circuit 103 designates a weighting value k corresponding to the determined result of the threshold value processing circuit 102. The weighting value k is supplied to amplifiers 104 and 105. The amplifier 104 adjusts the amplitude of the input frame. The amplifier 105 adjusts the amplitude of the chronologically earlier frame stored in the frame memory 99. The amplifier 104 amplitudes the input signal by k times. The amplifier 105 amplitudes the input signal by (1−k) times.

When the threshold value processing circuit 102 has determined that the current pixel does not have a motion, the value k is designated to a predetermined fixed value in the range from 0 to 0.5. An adding device 106 is disposed downstream of the amplifiers 104 and 105. The adding device 106 outputs the added value of an output value of the amplifier 104 (the pixel value of the current pixel of the current frame is multiplied by k) and an output value of the amplifier 105 (the pixel value of the current pixel of the chronologically earlier frame is multiplied by (1−k)). The current pixel position of the current frame is the same as the current pixel position of the chronologically earlier frame. On the other hand, when the threshold value processing circuit 102 has determined that the current pixel has a motion, the value k is designated to "1". Thus, the adding device 106 directly outputs the pixel value of the current pixel of the current frame.

However, in the related art reference, there are problems (a) to (d) that follow. As the problem (a), since a non-moving portion is weighted by a predetermined weighting value (fixed value k), when there are chronological fluctuations of the noise level and the relation between the noise level and the signal level, the noise cannot be accurately removed. As the problem (b), when the noise level is large, since a non-moving portion is incorrectly determined as a moving portion, the noise removing effect deteriorates. As the problem (c), when a moving portion is incorrectly determined as a non-moving portion, a dimmed portion may take place. As the problem (d), noise cannot be removed from a moving portion.

Therefore, an object of the present invention is to provide a picture processing apparatus, a picture processing method, a learning apparatus, and a learning method that allow noise to be accurately removed in an environment that the noise level chronologically fluctuates.

DISCLOSURE OF THE INVENTION

In one aspect of the present invention, a picture processing apparatus includes a storing portion for storing a plurality of frames of an input picture signal, a pixel extracting portion for extracting at least one pixel from a considered frame stored in the storing portion and at least one pixel from the other frames stored in the storing portion, a noise detecting portion for detecting chronological fluctuation of noise level between the frames according to the pixels extracted from the frames by the pixel extracting portion, and a picture signal generating portion for processing the considered frame of the input picture signal according to the fluctuation of the noise level and thereby generating a picture signal from which noise is removed.

A picture processing method of the present invention includes the steps of extracting at least one pixel from a considered frame of a plurality of frames of an input picture signal and at least one pixel from the other frames, detecting chronological fluctuation of noise level between the frames according to the pixels extracted from the frames, and processing the considered frame of the input picture signal according to the fluctuation of the noise level and thereby generating a picture signal from which noise is removed. frames according to the pixels extracted from the frames, and processing the considered frame of the input picture signal according to the fluctuation of the noise level and thereby generating a picture signal from which noise is removed.

In another aspect of the present invention, a learning apparatus includes a noise adding portion for adding a noise component to a teacher picture signal so as to generate a student picture signal, a storing portion for storing a plurality of frames of the student picture signal that is output from the noise adding portion, a pixel extracting portion for extracting at least one pixel from a considered frame of the student picture signal stored in the storing portion and at least one pixel from the other frames of the student picture signal stored in the storing portion, a noise detecting portion for detecting chronological fluctuation of noise level between the frames according to the pixel of each frame extracted by the pixel extracting portion and generating class information according to the fluctuation of the noise level, and a predictive coefficient calculating portion for calculating predictive coefficients for generating an output picture signal having the same quality as the teacher picture signal with an input picture signal having the same quality as the student picture signal according to the class information, the teacher picture signal, and the student picture signal.

A learning method of the invention comprises the steps of adding a noise component to a teacher picture signal so as to generate a student picture signal, extracting at least one pixel from a considered frame of the student picture signal that has been stored and at least one pixel from the other frames of the student picture signal that has been stored, detecting chronological fluctuation of the noise level between the frames according to the pixel of each frame extracted at the extracting step and generating class information according to the fluctuation of the noise level, and calculating predictive coefficients for generating an output picture signal having the same quality as the teacher picture signal with an input picture signal having the same quality as the student picture signal according to the class information, the teacher picture signal, and the student picture signal.

According to the present invention, corresponding to pixel data extracted from a predetermined number of frames, a noise removing process that accurately corresponds to the fluctuation of a noise component between frames can be performed.

BEST MODES FOR CARRYING OUT THE INVENTION

Next, an embodiment of the present invention will be described. According to the embodiment of the present invention, noise is removed corresponding to a class categorizing adaptive process. In the class categorizing adaptive process, an input picture signal is categorized as classes corresponding to a three-dimensional (time and space) distribution of signal levels thereof. Predictive coefficients that are pre-learnt for each class are stored in a memory. By a calculating process corresponding to a weighting expression using such predictive coefficients, an optimum estimated value (namely, a pixel value of which noise has been removed from the current pixel) is output.

Figure 1:
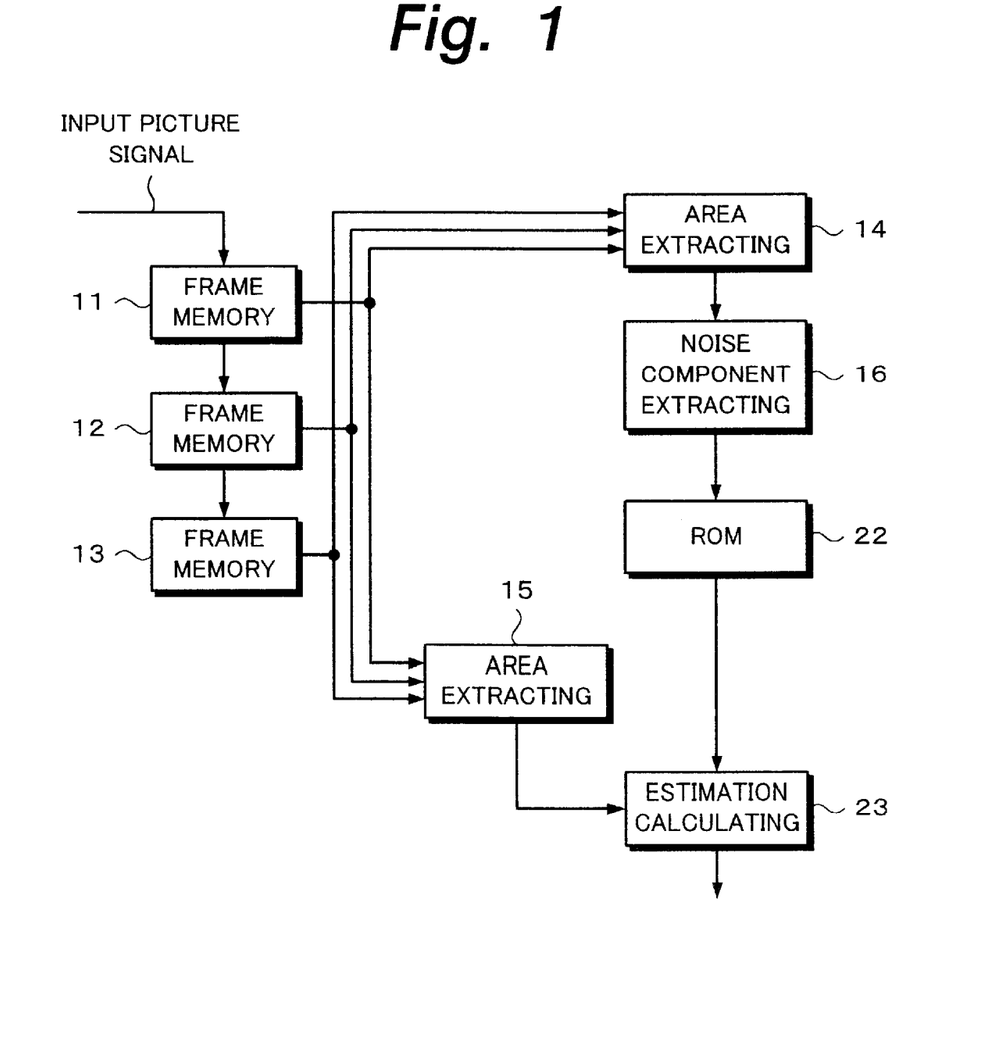
FIG. 1 is a block diagram showing the structure of a noise removing apparatus according to an embodiment of the present invention.

FIG. 1 shows the overall structure of the embodiment of the present invention. An input picture signal to be processed is supplied to a frame memory 11. The frame memory 11 stores a picture of the current frame. In addition, the frame memory 11 supplies a picture of the chronologically earlier frame to a frame memory 12 (the chronologically earlier frame is earlier than the current frame by one frame).

The frame memory 12 stores the supplied picture of one frame. In addition, the frame memory 12 supplies the picture of the chronologically earlier frame to a frame memory 13. Thus, later frames are successively stored to the frame memories 11, 12, and 13 in such an order. In the following description, it is assumed that the frame memory 12 stores the current frame of the input picture signal and that the frame memories 11 and 13 store the chronologically earlier frame and the chronologically later frame of the input picture signal, respectively. However, it should be noted that frames of the input picture signal stored in the frame memories 11, 12, and 13 are not limited to such an example. In other words, frames that are apart by two frames each may be stored. Alternatively, with five frame memories, pictures of chronologically successive five frames may be stored. As another alternative method, field memories may be used instead of frame memories.

The chronologically earlier frame, the current frame, and the chronologically later frame stored in the frame memories 13, 12, and 11, respectively, are supplied to area extracting portions 14 and 15. The area extracting portion 14 extracts pixels from particular positions (that will be descried later) of the individual frames and supplies the extracted pixel values to a noise component extracting portion 16. As will be described later, the noise component extracting portion 16 generates a class code that represents information of a noise component corresponding to output data of the area extracting portion 14 and supplies the generated class code to a ROM 22. Since pixels extracted by the area extracting portion 14 are used for generating a class code, they are referred to as class taps.

The ROM 22 stores pre-learnt predictive coefficients for each class (in reality, predictive coefficients at addresses corresponding to class codes). The ROM 22 outputs predictive coefficients corresponding to the class code that is supplied from the noise component extracting portion 16. Output data of the noise component extracting portion 16 is supplied to the ROM 22.

On the other hand, the area extracting portion 15 extracts predictive pixels from three successive frames stored in the frame memories 11, 12, and 13 and supplies the pixel values of the extracted pixels to an estimation calculating portion 23. The estimation calculating portion 23 performs a weighting calculation expressed by formula (1) for output data of the area extracting portion 15 and predictive coefficients that are read from the ROM 22 and generates a predictive picture signal from which noise has been removed. Since pixel values extracted by the area extracting portion 15 are used in the weighting calculation for generating a predictive picture signal, they are referred to as predictive taps.

$$y = w_1 \times x_1 + w_2 \times x_2 + \ldots + w_n \times x_n \tag{1}$$

where $x_1, \ldots x_n$ are predictive taps; and $w_1 \ldots w_n$ are predictive coefficients.

Figure 2:
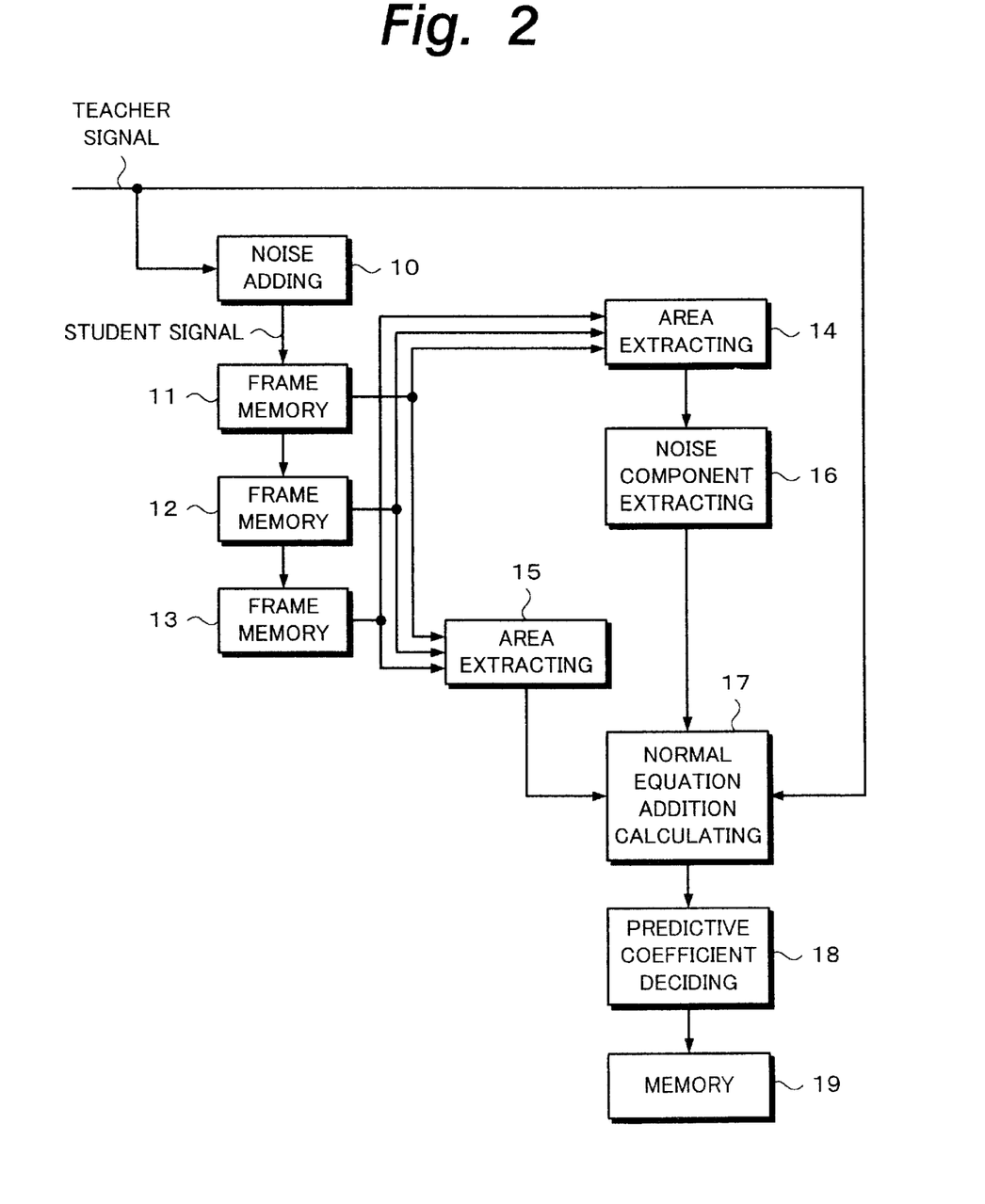
FIG. 2 is a block diagram showing the structure of a learning apparatus that obtains predictive coefficients according to the embodiment of the present invention.

Next, with reference to FIG. 2, a process for obtaining predictive coefficients recorded in the ROM 22 will be described. In FIG. 2, similar structural elements to those in FIG. 1 are denoted by similar reference numerals. An input picture signal that does not contain noise and that is learnt is supplied to a noise adding portion 10 and a normal equation addition calculating portion 17 (this input picture signal is referred to as teacher signal). The noise adding portion 10 adds a noise component to the input picture signal and generates a noise added picture (the generated signal is referred to as student signal). The noise adding portion 10 supplies the student signal to a frame memory 11. As with the structure shown in FIG. 1, the frame memories 11, 12, and 13 store respective pictures of three chronologically successive frames of the student signal. In the following description, it is assumed that the frame memory 12 stores the picture of the current frame and that the frame memories 11 and 13 store the pictures of the chronologically earlier frame and the chronologically later frame, respectively. However, as was described above, the pictures stored in the frame memories 11, 12, and 13 are not limited to those of the example.

Downstream of the frame memories 11, 12, and 13, the similar processes to those shown in FIG. 1 are performed. However, unlike with the structure shown in FIG. 1, a class code generated by a noise component extracting portion 16 and predictive taps extracted by an area extracting portion 15 are supplied to a normal equation addition calculating portion 17. In addition, the teacher signal is supplied to the normal equation addition calculating portion 17. The normal equation addition calculating portion 17 performs a calculating process for solving a normal equation corresponding to the three types of supplied input data and decides predictive coefficients for each class code. The normal equation addition calculating portion 17 supplies the decided predictive coefficients to a memory 19. The memory 19 stores the supplied predictive coefficients. The predictive coefficients stored in the memory 19 are the same as those stored in the ROM 22 (see FIG. 1).

Next, the normal equation will be described. In formula (1), before predictive coefficients w1, ..., wn are learnt, they are indeterminate coefficients. The predictive coefficients are learnt by inputting a plurality of teacher signals corresponding to individual classes. When the number of types of teacher signals corresponding to the individual classes is denoted by m, the following formula (2) is obtained from formula (1).

$$y_k = w_1 \times x_{k1} + w_2 \times x_{k2} + w_n \times x_{kn} \quad (2)$$

(k=1, 2, ..., m)

In the case of m>n, since the predictive coefficients $w_1, \ldots, w_n$ are not uniquely determined, elements $e_k$ of an error vector e are defined by the following formula (3). Predictive coefficients are defined so that the error vector e defined by formula (4) becomes minimum. In other words, predictive coefficients are uniquely determined by so-called method of least squares.

$$e_k = y_k - \{w_1 \times x_{k1} + w_2 \times x_{k2} + \ldots + w_n \times x_{kn}\} \quad (3)$$

(k=1, 2, ... m)

$$e^2 = \sum_{k=0}^{m} e_k^2 \quad (4)$$

As a real calculating method for obtaining predictive coefficients that minimize $e^2$ of formula (4), $e^2$ is partially differentiated with respect to predictive coefficients $w_i$ (i=1, 2, ...) (formula (5)) and predictive coefficients wi are obtained so that the partially differentiated value becomes 0 with respect to each value i.

$$\frac{\partial e^2}{\partial w_i} = \sum_{k=0}^{m} 2\left(\frac{\partial e_k}{\partial w_i}\right) e_k = \sum_{k=0}^{m} 2 x_{ki} \cdot e_k \quad (5)$$

Next, a real process for obtaining individual predictive coefficients $w_i$ from formula (5) will be described. When $X_{ji}$ and $Y_i$ are defined as formulas (6) and (7), formula (5) can be expressed by formula (8) as a matrix.

$$X_{ji} = \sum_{p=0}^{m} x_{pi} \cdot x_{pj} \quad (6)$$

$$Y_i = \sum_{k=0}^{} x_{ki} \cdot y_k \quad (7)$$

$$\begin{bmatrix} X_{11} & X_{12} & \ldots & X_{1n} \\ X_{21} & X_{22} & \ldots & X_{2n} \\ \ldots & \ldots & \ldots & \ldots \\ X_{n1} & X_{n2} & \ldots & X_{nn} \end{bmatrix} \begin{bmatrix} W_1 \\ W_2 \\ \ldots \\ W_n \end{bmatrix} = \begin{bmatrix} Y_1 \\ Y_2 \\ \ldots \\ Y_n \end{bmatrix} \quad (8)$$

Generally, formula (8) is referred to as normal equation. A predictive coefficient deciding portion 18 calculates each parameter of normal equation (8) corresponding to the three types of input data. In addition, the predictive coefficient deciding portion 18 performs a calculating process for solving normal equation (8) using a conventional matrix solution such as sweep-out method and obtains predictive coefficients $w_i$.

Next, the noise adding process used for learning predictive coefficients will be described. The noise adding process can be performed in the following four methods (1) to (4). In the method (1), as with a computer simulation, random noise is generated. The generated random noise is added to an input picture signal. In the method (2), noise is added to an input picture signal through an RF system. In the method (3), a flat picture signal whose level does not largely fluctuate is processed through an RF system. The difference between the original flat picture signal and the processed signal is extracted as a noise component. The noise component is added to an input picture signal. In the method (4), a flat signal is processed through an RF system. A plurality of frames of the processed signal are added. The difference between the processed signal and the added signal is extracted as a noise component. The extracted noise component is added to an input picture signal.

Figure 3:
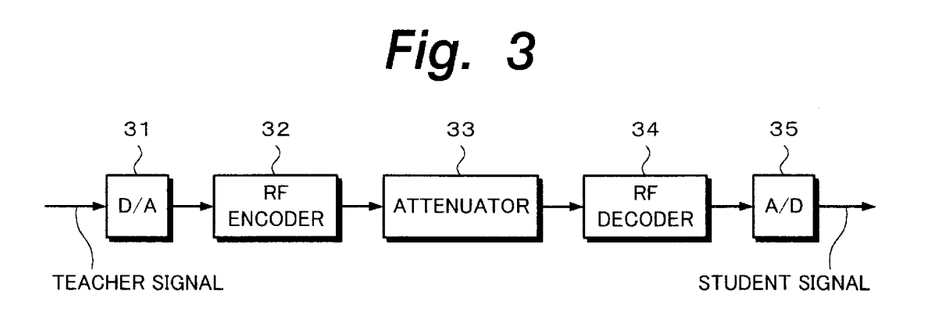
FIG. 3 is a block diagram showing a first example of the structure of a noise adding portion of the learning apparatus.

FIG. 3 shows an example of the structure for adding noise corresponding to the method (2). Referring to FIG. 3, a teacher signal is supplied to a D/A converter 31. The D/A converter 31 converts the teacher signal as a digital signal into an analog signal. The analog signal is supplied to an RF encoder 32. The RF encoder 32 performs an RF process such as a modulating process for the supplied signal. The RF encoder 32 supplies the resultant signal to an attenuator 33. The attenuator 33 performs an attenuating process for the supplied signal. An output signal of the attenuator 33 is supplied to an RF decoder 64. The RF decoder 32 demodulates the supplied signal. The RF decoder 32 supplies the demodulated signal to an A/D converter 35.

The A/D converter 35 converts the supplied signal as an analog signal into a digital signal. As an output signal of the A/D converter 35, a noise added picture signal (namely, a student signal) is obtained. The pixel positions of the picture of the student signal deviate from those of the picture of the teacher signal because the sampling positions deviate therebetween. Thus, when noise is added corresponding to the method (2), weighting coefficients obtained as the learnt results of predictive coefficients represent the deviation of the pixel positions. To solve such a problem, it is preferred to detect the deviation between the pixel positions of the teacher signal and those of the student signal and match them corresponding to the detected result. In the method (2), it is preferred to consider the deviation of an DC offset component due to an RF system between the teacher signal and the student signal from which noise is removed.

Figure 4:
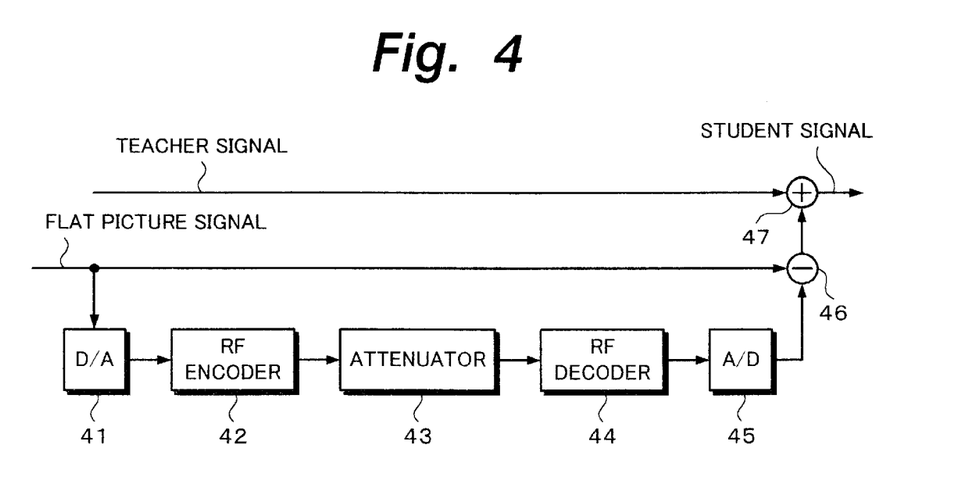
FIG. 4 is a block diagram showing a second example of the structure of the noise adding portion of the learning apparatus.

FIG. 4 shows an example of the structure for adding noise corresponding to the method (3). Referring to FIG. 4, a flat picture signal is supplied to a D/A converter 41 and an attenuator 46. The D/A converter 41 converts the supplies signal as a digital signal into an analog signal. The D/A converter 41 supplies the analog signal to an RF encoder 42. The RF encoder 42 performs an RF process for the supplied signal. The RF encoder 42 supplies the resultant signal to an attenuator 43. The attenuator 43 performs an attenuating process for the supplied signal.

An output signal of the attenuator 43 is supplied to an RF decoder 44. The RF decoder 44 demodulates the supplied signal and supplies the demodulated signal to an A/D converter 45. The A/D converter 45 converts the supplied signal as an analog signal into a digital signal.

An output signal of the A/D converter 45 is supplied to a subtracting device 46. The subtracting device 46 subtracts the flat picture signal from the output signal of the A/D converter 35 (namely, a noise added signal) and thereby extracts a noise component. The subtracting device 46 supplies the extracted noise component to an adding device 47. In addition, a teacher signal is supplied to the adding device 47. The adding device 47 adds the teacher signal and the noise component as an output signal of the subtracting device 46 and thereby generates a student signal.

Figure 5:
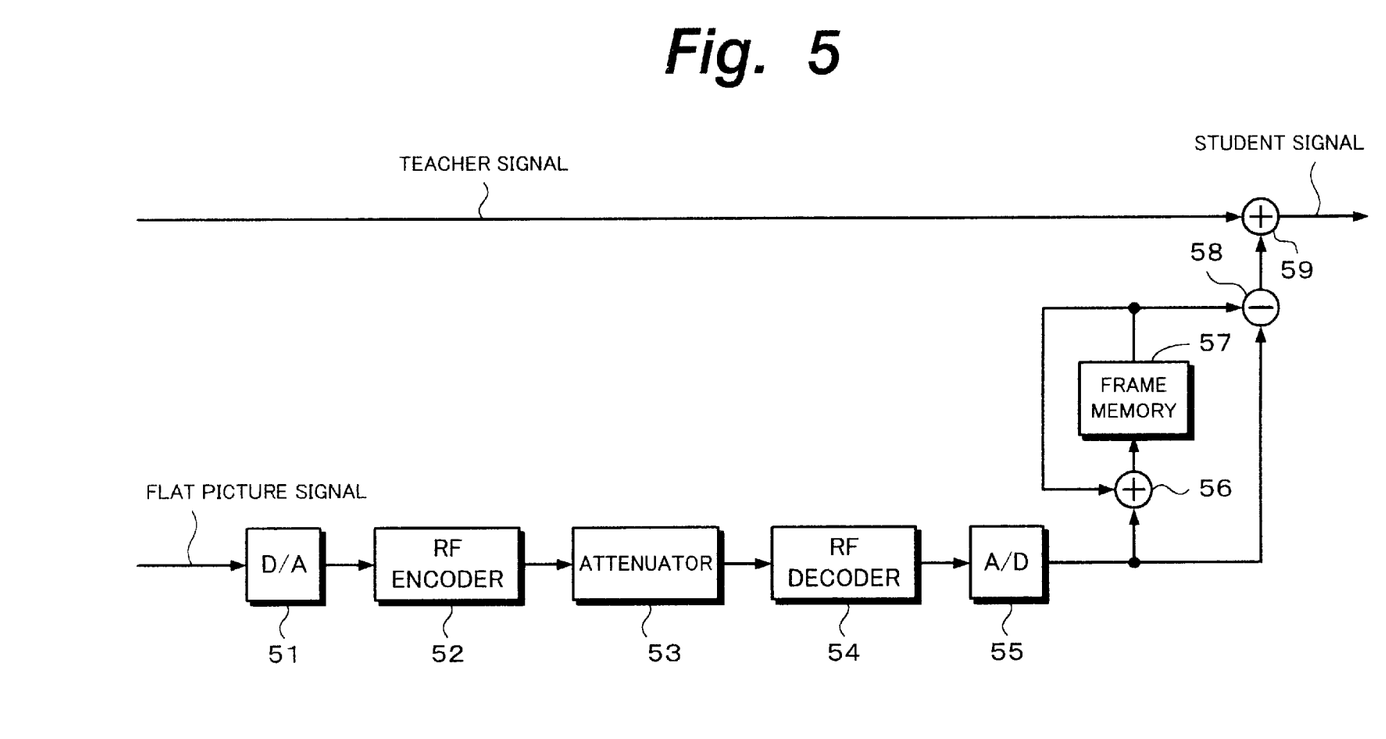
FIG. 5 is a block diagram showing a third example of the structure of the noise adding portion of the learning apparatus.

FIG. 5 shows an example of the structure for adding noise corresponding to the method (4). Referring to FIG. 5, a flat picture signal is supplied to a D/A converter 51. The D/A converter 51 converts the supplied signal as a digital signal into an analog signal and supplies the analog signal to an RF encoder 52. The RF encoder 52 performs an RF process for the supplied signal and supplies the resultant signal to an attenuator 53. The attenuator 53 performs an attenuating process for the supplied signal. An output signal of the attenuator 53 is supplied to an RE decoder 54. The RF decoder 54 demodulates the supplied signal and supplies the demodulated signal to an A/D converter 55. The A/D converter 55 converts the supplied signal as an analog signal into a digital signal.

An output signal of the A/D converter 55 is supplied to an adding device 56 and a subtracting device 58. Data stored in a frame memory 57 is also supplied to the adding device 56. The added result of the adding device 56 is supplied to the frame memory 57. The frame memory 57 stores the added result supplied from the adding device 56. The data stored in the frame memory 57 is supplied to the adding device 56 and the subtracting device 58. The adding device 56 and the frame memory 57 structure a recursive filter type noise removing circuit. Thus, the frame memory 57 outputs a picture signal from which noise has been removed.

The subtracting device 58 calculates the difference between the output signal of the frame memory 57 and the output signal of the A/D converter 55 and thereby extracts a noise component. The subtracting device 58 supplies the extracted noise component to an adding device 59. A teacher signal is also supplied to the adding device 59. The adding device 59 adds the teacher signal and the noise component and thereby generates a student signal.

Figure 6A:
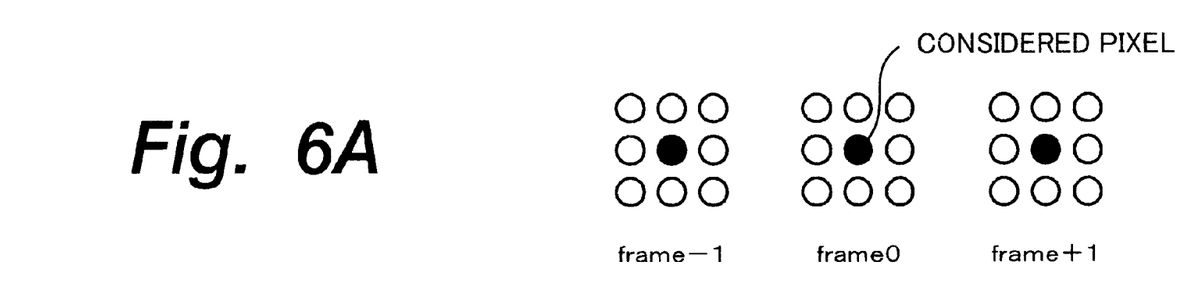
FIGS. 6A and 6B are schematic diagram for explaining a class tap structure according to the embodiment of the present invention.

Next, a class tap extracting process performed by the area extracting portion 14 will be described in detail. FIG. 6A shows an example of the structure of class taps. In FIG. 6A, only pixels denoted by black dots are extracted as class taps. In other words, only a considered pixel is extracted as a class tap from the current frame. One pixel is extracted as a class tap from each of the chronologically earlier frame and the chronologically later frame so that the position of the pixel extracted from each of the chronologically earlier frame and the chronologically later frame matches the position of the considered pixel extracted from the current frame. The same tap structure can be applied to predictive taps.

Figure 6B:
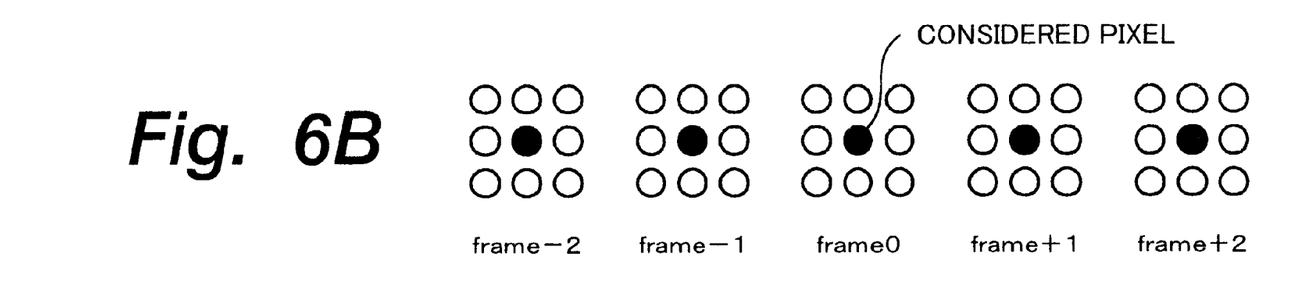

Alternatively, as shown in FIG. 6B, five successive frames may be stored instead of three successive frames. Thus, five frame memories may be used instead of three frame memories. In this case, for example, the current frame, two chronologically earlier frames, and two chronologically later frames are stored. Only a considered pixel is extracted from the current frame. A pixel is extracted from each of the two chronologically earlier frames and two chronologically later frames so that the positon of the extracted pixel matches the position of the considered pixel. In this case, since the pixel area, from which pixels are extracted is chronologically expanded, noise can be more effectively removed.

Figure 7:
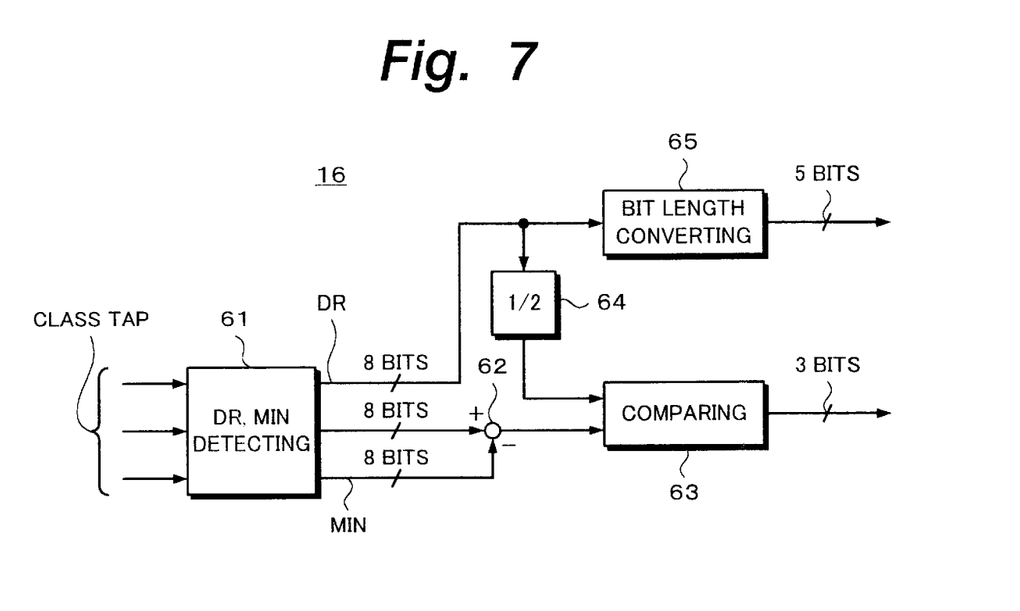
FIG. 7 is a block diagram showing an example of the structure of a noise component extracting portion according to the embodiment of the present invention.

The noise component extracting portion 16 detects a noise component with an ADRC (Adaptive Dynamic Range Coding) output signal corresponding to an output signal of the area extracting portion 14, categorizes the noise component as a class, and generates a class code.

FIG. 7 shows an example of the structure of the noise component extracting portion 16. The noise component extracting portion 16 shown in FIG. 7 generates a class code corresponding to one-bit ADRC process. A total of three pixels that are a considered pixel and two pixels are extracted from the current frame, the chronologically earlier frame, and the chronologically later frame stored in the frame memories 11, 12, and 13 so that the position of the considered pixel matches the positon of each of the other extracted pixels. The extracted pixels are supplied to a detecting circuit 61. The value of each pixel is represented with for example eight bits. The detecting circuit 61 detects the maximum value MAX and the minimum value MIN of the pixel values of the three is pixels, calculates MAX−MIN=DR, and obtains the dynamic range DR.

The three pixel values are successively supplied from the detecting circuit 61 to a subtracting circuit 62. The subtracting circuit 62 subtracts the minimum value MIN from each pixel value. The resultant normalized values are supplied to a comparing circuit 63. Output data (DR/2) of which the dynamic range DR is halved is supplied from a bit shift circuit 64 to the comparing circuit 63. When the current bit value is larger than DR/2, the compared result of the comparing circuit 63 becomes "1" (as a one-bit value). Otherwise, the compared result of the comparing circuit 63 becomes "0". The comparing circuit 63 parallelizes the compared results of the three pixels and outputs a three-bit ADRC output signal. The dynamic range DR is supplied to a bit length converting circuit 65. The bit length converting circuit 65 converts eight-bit data into five-bit data corresponding to a quantizing process. In the tap structure shown in FIG. 6B, a five-bit ADRC output signal is obtained.

In the above-described tap structure, when an input picture signal is a still picture, the pixel values of the pixels of the frames do not vary. Thus, in the case that an input picture signal is a still picture, when the pixel values of the pixels of the frames vary, it can be determined that noise affects the pixel values.

Figure 8:
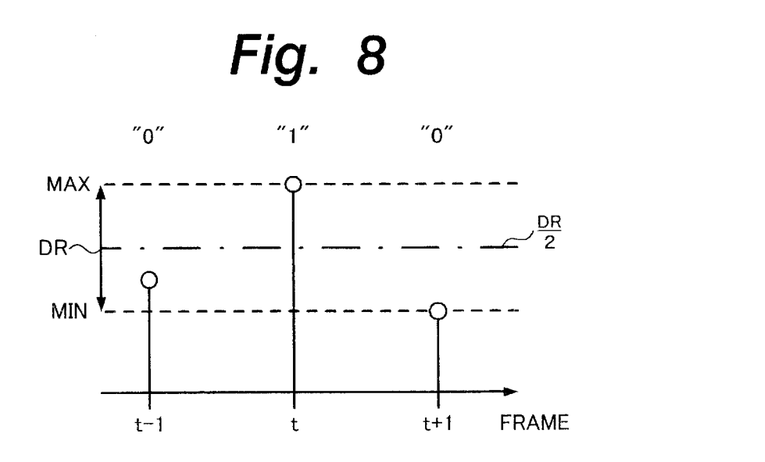
FIG. 8 is a schematic diagram for explaining the noise component extracting portion.

As an example, as shown in FIG. 8, pixel values of class taps extracted from frames t−1, t, and t+1 that are chronologically successive are processed corresponding to the one-bit ADRC process. Thus, a three-bit (010) ADRC output signal is generated. In addition, a five-bit dynamic range DR is output. The three-bit ADRC output signal represents a fluctuation of the noise level. In this case, when the ADRC process is performed with multi bits instead of one bit, the fluctuation of the noise level can be more accurately represented. The five-bit code to which the dynamic range DR is converted represents the noise level. The eight-bit code of the dynamic range DR is converted into the five-bit code so as to suppress an increase of the number of classes.

Thus, the class code generated by the noise component extracting portion 16 contains the three-bit code that represents the chronological fluctuation of the noise level as the result of the ADRC process and the five-bit code that represents the noise level obtained as the dynamic range DR. Since the dynamic range DR is used for categorizing a noise component as a class, a moving portion can be distinguished from noise. In addition, the noise level can be represented.

The above-described embodiment of the present invention is mainly suitable for the case that noise is removed from a still picture. In another embodiment of the present invention, noise is removed corresponding to a class categorizing adaptive process in consideration of a motion of a picture. In other words, according to the other embodiment, corresponding to a motion estimated from an input picture signal, pixels referenced to detect a noise component and a picture area used for a calculating process for removing noise are extracted. The class categorizing adaptive process is performed for the extracted data and thereby a picture from which noise has been removed is output.

Figure 9:
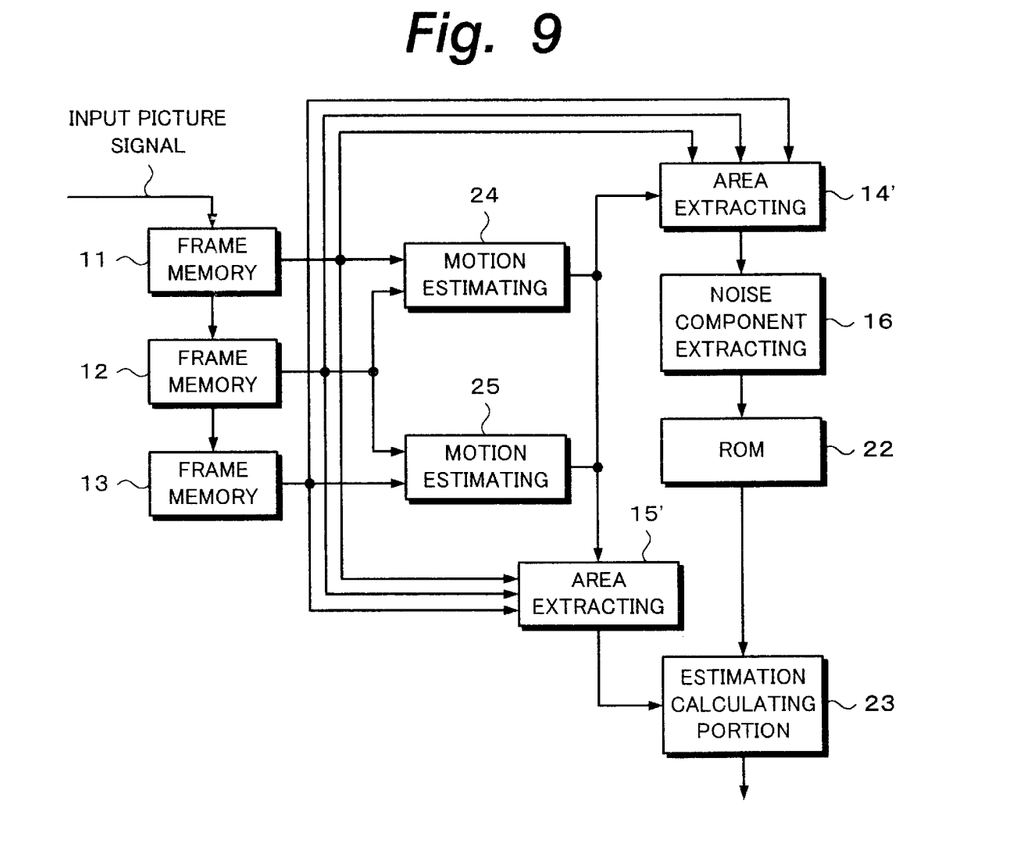
FIG. 9 is a block diagram showing the structure of a noise removing apparatus according to another embodiment of the present invention.

FIG. 9 shows the structure of a noise removing apparatus according to another embodiment. As with the above-described embodiment, according to the embodiment shown in FIG. 9, frame memories 11, 12, and 13 are disposed. Pictures of three chronologically successive frames are stored in the frame memories 11, 12, and 13. For simplicity, in FIG. 9, similar portions to those in FIG. 1 are denoted by similar reference numerals.

In FIG. 9, reference numerals 9 and 10 represent motion estimating portions. The motion estimating portion 24 estimates the motion of a considered pixel between the picture of the current frame stored in the frame memory 12 and the picture of the chronologically earlier frame stored in the frame memory 13. The motion estimating portion 25 estimates the motion of the considered pixel between the picture of the current frame stored in the frame memory 12 and the picture of the chronologically later frame stored in the frame memory 11. The motions (directions and amounts) of the considered pixel estimated by the motion estimating portions 24 and 25 are supplied to area extracting portions 14' and 15', respectively. As examples of the motion estimating method, block matching method, estimating method using correlation coefficients, and slope method can be used.

As with the area extracting portion 14 according to the above-described embodiment, the area extracting portion 14' extracts the pixel values of class taps. Likewise, as with the area extracting portion 15 according to the above-described embodiment, the area extracting portion 15' extracts the pixel values of predictive taps. When the area extracting portions 14' and 15' extract pixels, the pixel positions of the pixels that are extracted are compensated corresponding to the estimated motions so that the position of each pixel extracted from the chronologically earlier frame and the chronologically later frame matches the position of the considered pixel of the current frame.

The pixel values of the class taps extracted by the area extracting portion 14' are supplied to a noise component extracting portion 16. As with the above-described embodiment, the noise component extracting portion 16 performs the one-bit ADRC process and thereby generates a class code. The class code is supplied to a ROM 22. Corresponding to the class code, predictive coefficients are read from the ROM 22. An estimation calculating portion 23 performs a calculation of the linear combination of formula (1) with the pixel values of the predictive taps extracted by the area extracting portion 15' and the predictive coefficients that are read from the ROM 22 and thereby generates output pixel values from which noise has been removed.

Since processes performed downstream of the area extracting portions 14' and 15' are the same as those of the above-described embodiment, for simplicity, their description is omitted.

Figure 10:
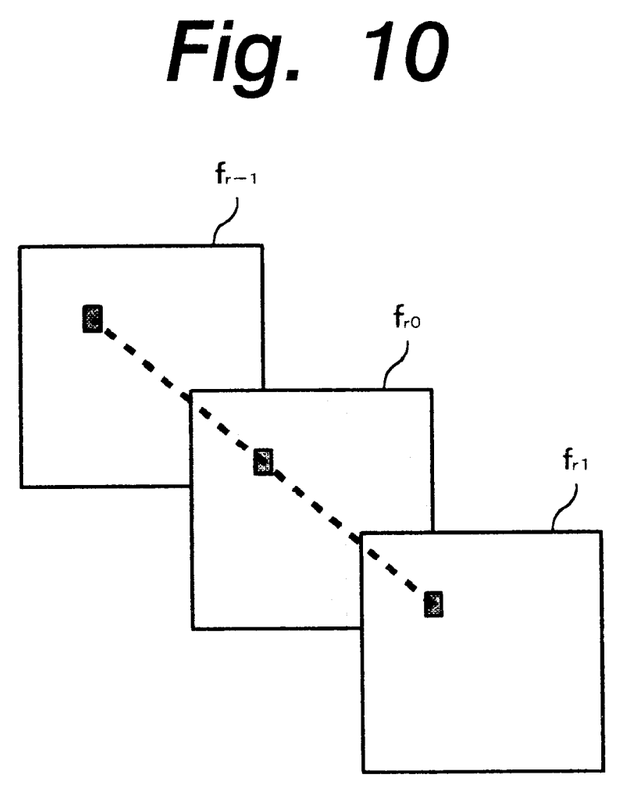
FIG. 10 is a schematic diagram for explaining a class tap structure according to another embodiment of the present invention.

Next, with reference to FIG. 10, a process performed by the area extracting portion 14' will be described in detail. The area extracting portion 14' extracts pixels from pixel positions designated in the tap structure as shown in FIG. 10. The tap structure shown in FIG. 10 is the same as the tap structure shown in FIG. 6. In other words, only one pixel is extracted from each of a chronologically earlier frame fr−1, a current frame fr0, and a chronologically later frame fr1. When the motion of the extracted pixels is very small and thereby the motion estimating portions 24 and 25 determine that they stop, the pixels are extracted as class taps from the same position of these frames so as to detect noise. Thus, since the position of the class tap of each frame is constant, the tap structure does not vary.

When the motion of the extracted pixels exceeds a predetermined value and thereby the motion estimating portions 24 and 25 determines that they moves, the positions of the extracted pixels are compensated corresponding to the motion so that the pixels at the same position of the frames are extracted as class taps. The position of the pixel extracted from the chronologically later frame is compensated by the motion estimated by the motion estimating portion 24. Likewise, the position of the pixel extracted from the chronologically earlier frame fr−1 is compensated by the motion estimated by the motion estimating portion 25.

The motion of the pixels extracted by the area extracting portion 15' is compensated in the same manner as the area extracting portion 14'. As the result of the motion compensating process, the spatial positions of the class taps extracted by the area extracting portion 14' are the same. Likewise, as the result of the motion compensating process, the spatial positions of the predictive taps extracted by the area extracting portion 15' are the same. Except the extracted class taps and predictive taps are motion-compensated, in the same process as the above-described embodiment, an output picture signal from which noise has been removed is generated.

Figure 11:
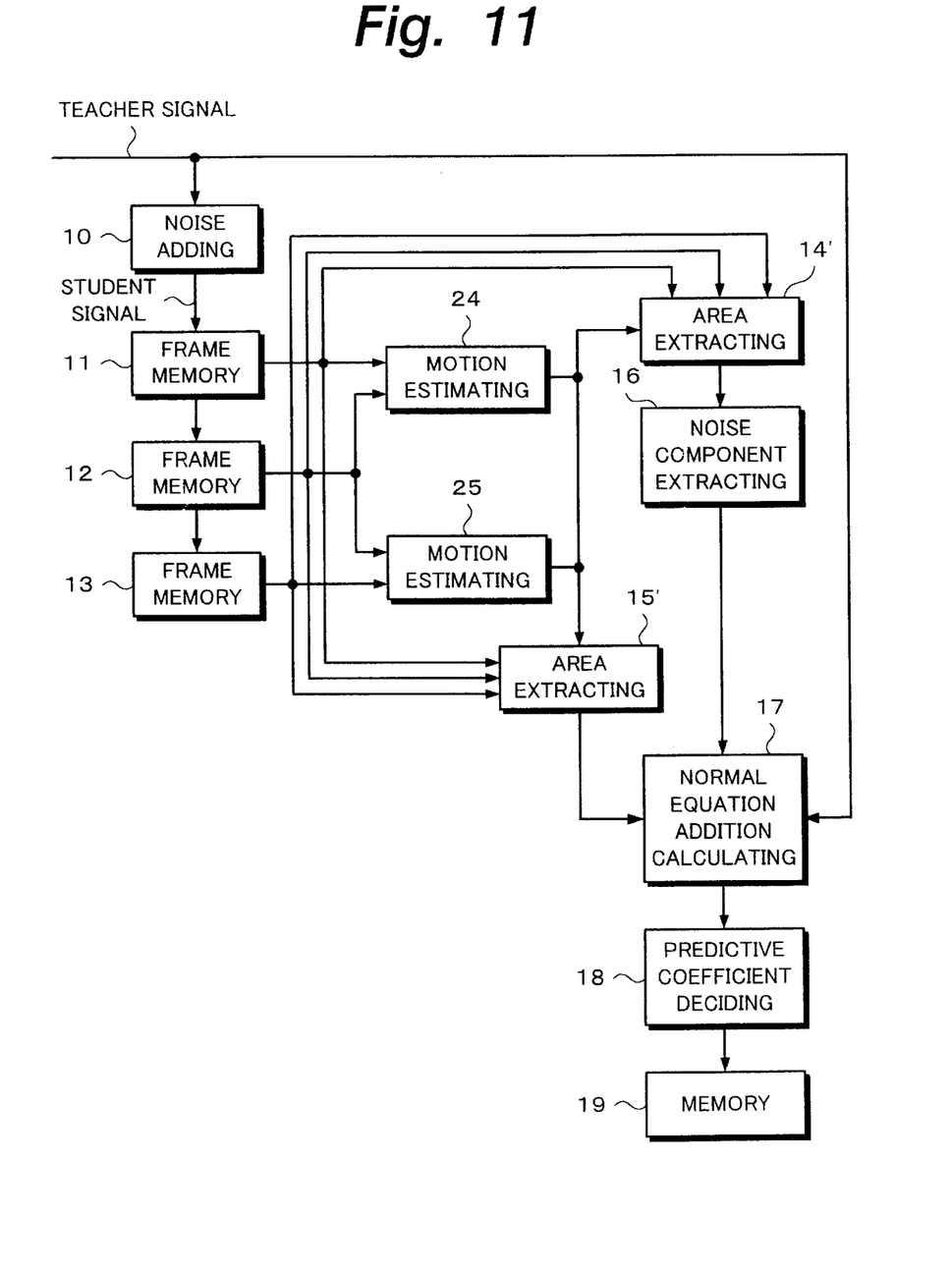
FIG. 11 is a block diagram showing the structure of a learning apparatus that obtains predictive coefficients according to another embodiment of the present invention.

FIG. 11 shows the structure of a learning apparatus according to another embodiment of the present invention. The learning apparatus shown in FIG. 11 obtains predictive coefficients used for a ROM 22. As with the picture processing apparatus used to remove noise (see FIG. 9), motion estimating portions 24 and 25 are disposed. Area extracting portions 14' and 15' have a function for estimating a motion corresponding to the estimated results of the motion estimating portions 24 and 25, respectively.

Class taps extracted by the area extracting portion 14' are supplied to a noise component extracting portion 16. The noise component extracting portion 16 generates a class code. The class code, the predictive taps extracted by the area extracting portion 15', and a teacher signal are supplied to a normal equation addition calculating portion 17. The normal equation addition calculating portion 17 performs a calculating process for solving a normal equation corresponding to these input data and decides predictive coefficients for the input class code. The decided predictive coefficients are stored to a memory 19. Since the predictive coefficients are decided corresponding to the method of least squares as with the above-descried embodiment, the description is omitted.

It should be noted that the present invention is not limited to the above-described embodiments. In other words, various other changes, omissions, and additions of the present invention are available without departing from the spirit and scope of the present invention.

As described above, according to the present invention, when the class categorizing adaptive process is performed for removing noise from a picture signal, a considered pixel and a pixel at the same position thereof are extracted as class taps. Corresponding to the class tap data, the fluctuation of a noise level between frames is detected. A class code is generated corresponding to the fluctuation of the detected noise level. In addition, according to the present invention, pixels used for the noise component detecting process (namely, class taps) and pixels used for the prediction calculating process (predictive taps) are extracted so that the estimated motion is compensated. For each class code corresponding to a noise component, a picture signal from which noise is removed is calculated with a liner combination of the predictive taps and the predictive coefficients.

According to the present invention, using an estimation calculating process with predictive coefficients that accurately corresponds to the fluctuation of a noise component between frames, a noise component can be properly removed.

When there is a motion of frames, a noise level can be correctly detected and the noise can be removed. In particular, since a moving portion is prevented from being incorrectly determined as a non-moving portion, a dimmed portion does not take place in the picture.

When a class tap structure of which class taps do not spread in a frame is used (namely, a considered pixel extracted from a current frame, a pixel extracted from a chronologically earlier frame, and a pixel extracted from a chronologically later frame are used as class taps and/or predictive taps so that the pixel positions of these pixels are the same), a factor that causes a dimmed portion to take place in the spatial direction can be prevented from affecting the process. In other words, a dimmed portion due to an edge or the like can be prevented from taking place in an output picture signal.

What is claimed is:

1. A picture processing apparatus, comprising:
   a storing portion for storing a plurality of frames of an input picture signal;
   a pixel extracting portion for extracting at least one pixel from a considered frame stored in said storing portion and at least one pixel from the other frames stored in said storing portion;
   a noise detecting portion for detecting predicted chronological fluctuation of noise level between the frames according to the pixels extracted from the frames by said pixel extracting portion; and a picture signal generating portion for processing the considered frame of the input picture signal according to the predicted fluctuation of the noise level and thereby generating a picture signal from which noise is removed;
   whereby each of said frames used for detecting predicted chronological fluctuation of noise level are frames which have not undergone any noise reduction processing.

2. The picture processing apparatus as set forth in claim 1, further comprising:
   a motion detecting portion for detecting motion between the frames according to the plurality of frames of the input picture signal stored in said storing portion,
   wherein said pixel extracting portion extracts the pixel at a position in the frame determined according to the motion detected by said motion detecting portion from respective frames of the input picture signal.

3. The picture processing apparatus as set forth in claim 1,
   wherein said noise detecting portion detects the fluctuation of the noise level for each pixel.

4. The picture processing apparatus as set forth in claim 1,
   wherein said pixel extracting portion extracts a pixel from each of the other frames so that the position of the pixel matches the position of a pixel extracted from the considered frame.

5. The picture processing apparatus as set forth in claim 1,
   wherein said pixel extracting portion extracts one pixel from each of the frames of the input picture signal stored in said storing portion, and
   wherein said noise detecting portion detects the fluctuation of the noise level of the pixel extracted from the considered frame according to the pixel extracted from each of the frames of the input picture signal.

6. The picture processing apparatus as set forth in claim 1,
   wherein said noise detecting portion includes:
   means for computing a dynamic range value representing the difference between a maximum pixel value and a minimum pixel value of n corresponding pixels in n different frames, respectively, where n is at least three; and
   means for forming a n-bit code representing a noise level fluctuation between chronological frames, with each bit associated with one of said n pixels and each bit representing a condition of the associated pixel having a value above or below a prescribed fraction of said dynamic range value.

7. The picture processing apparatus as set forth in claim 1,
   wherein said picture signal generating portion generates a picture signal according to a class categorizing adaptive process.

8. The picture processing apparatus as set forth in claim 1, wherein the predicted chronological fluctuation of noise level is presented based on pixel values of pixels in each of three or more frames, said pixels being extracted by said pixel extracting portion.

9. A picture processing method, comprising the steps of:
   extracting at least one pixel from a considered frame of a plurality of frames of an input picture signal and at least one pixel from the other frames;
   detecting predicted chronological fluctuation of noise level between the frames according to the pixels extracted from the frames; and processing the considered frame of the input picture signal according to the predicted fluctuation of the noise level and thereby generating a picture signal from which noise is removed;

whereby each of said frames used for detecting predicted chronological fluctuation of noise level are frames which have not undergone any noise reduction processing.

10. The picture processing method as set forth in claim 9, further comprising the step of:

detecting motion between the frames according to the plurality of frames of the input picture signal, wherein the extracting step is performed by extracting the pixel at a position in the frame determined according to the motion detected at the detecting step from respective frames of the input picture signal.

11. The picture processing method as set forth in claim 9, wherein the detecting step is performed by detecting the fluctuation of the noise level for each pixel.

12. The picture processing method as set forth in claim 9, wherein the extracting step is performed by extracting a pixel from each of the other frames so that the position of the pixel matches the position of a pixel extracted from the considered frame.

13. The picture processing method as set forth in claim 9, wherein the extracting step is performed by extracting one pixel from each of the frames of the input picture signal, and wherein the detecting step is performed by detecting the fluctuation of the noise level of the pixel extracted from the considered frame according to the pixel extracted from each of the frames of the input picture signal.

14. The picture processing method as set forth in claim 9, wherein the detecting step is performed by:

computing a dynamic range value representing the difference between a maximum pixel value and a minimum pixel value of n corresponding pixels in n different frames, respectively, where n is at least three; and forming a n-bit code representing a noise level fluctuation between chronological frames, with each bit of said n-bit code associated with one of said n pixels and each bit representing a condition of the associated pixel having a value above or below a prescribed fraction of said dynamic range value.

15. The picture processing method as set forth in claim 9, wherein the generating step is performed by generating a picture signal according to a class categorizing adaptive process.

16. The picture processing method as set forth in claim 9, wherein the predicted chronological fluctuation of noise level is presented based on pixel values of pixels in each of three or more frames, said pixels being extracted in said extracting step.

17. A learning apparatus, comprising:

a noise adding portion for adding a noise component to a teacher picture signal so as to generate a student picture signal;

a storing portion for storing a plurality of frames of the student picture signal that is output from said noise adding portion;

a pixel extracting portion for extracting at least one pixel from a considered frame of the student picture signal stored in said storing portion and at least one pixel from the other frames of the student picture signal stored in said storing portion;

a noise detecting portion for detecting chronological fluctuation of noise level between the frames according to the pixel of each frame extracted by said pixel extracting portion and generating class information according to the fluctuation of the noise level; and a predictive coefficient calculating portion for calculating predictive coefficients for generating an output picture signal having the same quality as the teacher picture signal with an input picture signal having the same quality as the student picture signal according to the class information, the teacher picture signal, and the student picture signal.

18. The learning apparatus as set forth in claim 17, wherein said predictive coefficient calculating portion inputs the class information, the teacher picture signal, and student picture signal and calculates predictive coefficients according to the method of least squares so that the sum of squares of the difference between predictive values calculated by a linear combination of a plurality of pixel values of the student picture signal and predictive coefficients and the real values of the teacher picture signal is minimized.

19. The learning apparatus as set forth in claim 17, further comprising:

a motion detecting portion for detecting the motion between the frames according to the plurality of frames of the student picture signal stored in said storing portion, wherein said pixel extracting portion extracts the pixel at a position in the frame determined according to the motion detected by said motion detecting portion from respective frames of the input picture signal.

20. The learning apparatus as set forth in claim 17, wherein said noise detecting portion detects the fluctuation of the noise level for each pixel.

21. The learning apparatus as set forth in claim 17, wherein said pixel extracting portion extracts a pixel from each of the other frames so that the position of the pixel matches the position of a pixel extracted from the considered frame.

22. The learning apparatus as set forth in claim 17, wherein said pixel extracting portion extracts one pixel from each of the frames of the input picture signal stored in said storing portion, and wherein said noise detecting portion detects the fluctuation of the noise level of the pixel extracted from the considered frame according to the pixel extracted from each of the frames of the input picture signal.

23. The learning apparatus as set forth in claim 17, wherein said noise detecting portion includes:

means for computing a dynamic range value representing the difference between a maximum pixel value and a minimum pixel value of n corresponding pixels in n different frames, respectively, where n is at least three; and means for forming a n-bit code representing a noise level fluctuation between chronological frames, with each bit associated with one of said n pixels and each bit representing a condition of the associated pixel having a value above or below a prescribed fraction of said dynamic range value.

24. The learning apparatus as set forth in claim 17, wherein said noise adding portion adds said noise component by adding random noise to said teacher picture signal.

25. The learning apparatus as set forth in claim 17, wherein said noise adding portion adds said noise component by adding noise to said teacher picture signal through an RF system.

26. The learning apparatus as set forth in claim 17, wherein said noise adding portion adds said noise component by processing a flat picture signal, whose level does not significantly fluctuate, through an RF system; and extracting said noise component as the difference between the original flat picture signal and the processed signal, whereby said extracted noise component is added to said teacher picture signal.

27. The learning apparatus as set forth in claim 17, wherein said noise adding portion comprises:
D/A conversion means for converting a flat picture signal to an analog signal;
RF encoding means for performing an RF process on the analog signal;
RF decoding means for demodulating the analog signal processed by said RF encoding means;
A/D conversion means for converting the demodulated analog signal to a digital signal;
a frame memory;
adding means for adding data stored in said frame memory with said digital signal; and
subtracting means for calculating a difference between an output signal of said frame memory and an output signal of said A/D conversion means to extract said noise component.

28. A learning method, comprising the steps of:
adding a noise component to a teacher picture signal so as to generate a student picture signal;
extracting at least one pixel from a considered frame of the student picture signal that has been stored and at least one pixel from the other frames of the student picture signal that has been stored;
detecting chronological fluctuation of noise level between the frames according to the pixel of each frame extracted at the extracting step and generating class information according to the fluctuation of the noise level; and
calculating predictive coefficients for generating an output picture signal having the same quality as the teacher picture signal with an input picture signal having the same quality as the student picture signal according to the class information, the teacher picture signal, and the student picture signal;
whereby each of said frames used for detecting predicted chronological fluctuation of noise level are frames which have not undergone any noise reduction processing.

29. The learning method as set forth in claim 28, wherein the predictive coefficient calculating step is performed by inputting the class information, the teacher picture signal, and student picture signal and calculating predictive coefficients according to the method of least squares so that the sum of squares of the difference between predictive values calculated by a linear combination of a plurality of pixel values of the student picture signal and predictive coefficients and the real values of the teacher picture signal is minimized.

30. The learning method as set forth in claim 28, further comprising the step of:
detecting the motion between the frames according to the plurality of frames of the student picture signal,
wherein the extracting step is performed by extracting the pixel at a position in the frame determined according to the motion detected at the detecting step from respective frames of the input picture signal.

31. The learning method as set forth in claim 28, wherein the noise detecting step is performed by detecting the fluctuation of the noise level for each pixel.

32. The learning method as set forth in claim 28, wherein the extracting step is performed by extracting a pixel from each of the other frames so that the position of the pixel matches the position of a pixel extracted from the considered frame.

33. The learning method as set forth in claim 28, wherein the extracting step is performed by extracting one pixel from each of the frames of the input picture signal, and wherein the detecting step is performed by detecting the fluctuation of the noise level of the pixel extracted from the considered frame according to the pixel extracted from each of the frames of the input picture signal.

34. The learning method as set forth in claim 28, wherein the detecting step is performed by:
computing a dynamic range value representing the difference between a maximum pixel value and a minimum pixel value of n corresponding pixels in n different frames, respectively, where n is at least three; and
forming a n-bit code representing a noise level fluctuation between chronological frames, with each bit of said n-bit code associated with one of said n pixels and each bit representing a condition of the associated pixel having a value above or below a prescribed fraction of said dynamic range value.

* * * * *